United States Patent Office 3,196,691
Patented July 27, 1965

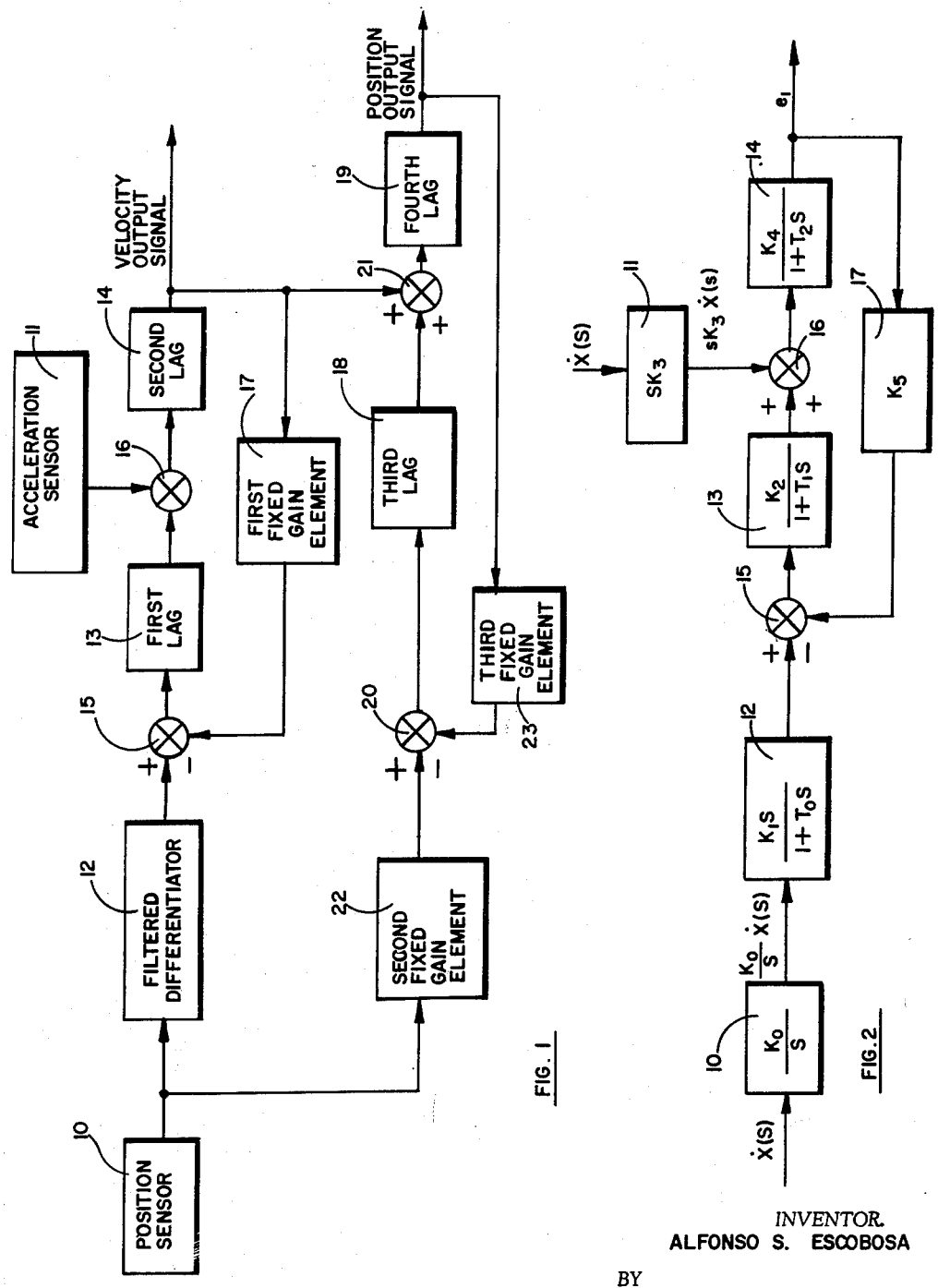

3,196,691
WIDE BAND SENSING APPARATUS
Alfonso S. Escobosa, Fullerton, Calif., assignor to
North American Aviation, Inc.
Filed Nov. 15, 1961, Ser. No. 152,457
8 Claims. (Cl. 73—490)

This invention relates to improved means for providing rate and position signals, and more particularly to rate and position signal means having improved dynamic response and noise filtering.

In closed loop control systems for providing position and rate control of a vehicle, dynamic stability considerations of the closed-loop performance require that the sensors employed have an adequately wide band of frequency response. Such a frequency response is essentially a flat amplitude ratio response characteristic (e.g., fixed amplitude ratio of output signal to forcing function over the frequency response range of the controlled vehicle) having a negligible phase lag associated therewith. Further, in the static control of the vehicle to small distances within close tolerances (such as vertical control in an aircraft automatic landing system or in a hydrofoil vehicle altitude controller) it is required that the D.-C. output or the low frequency drift characteristic of the sensor be stable (e.g., for a given height above a reference plane, the control system height signal should not drift or change appreciably with respect to time).

In the prior art, such high performance characteristics represented by low drift and a flat frequency response over a wide band of frequencies have been sought in inertial sensors through the use of high precision components employed in a force rebalance type application. Such a device is represented, for example, in U.S. Patent No. 2,964,949 issued December 20, 1960, to D. Wilcox for Induction Velocity Meter. Such devices are intended for the close tolerance requirements of inertial navigation systems and are extremely expensive. Further, the friction and torque unbalances inherent in such devices, while minimal, are yet sufficient to cause drift in the output of the device. Control of such drift in vertical motion sensing applications requires monitoring by an external reference or other device having the desired low-drift characteristic. Such a device may be comprised of a radar altimeter in an altitude control system, for example.

Efforts in the prior art have attempted to extend the useful range of sensors by employing in series with the output thereof, an electrical network having a transfer function $H(s)$ which was the reciprocal of that of the sensor itself, $G(s)$, whereby the product of the two was unity within the frequency range of interest. Such an arrangement is described for example, in U.S. Patent 2,959,347 issued November 8, 1960, to Kearns for Means for Extending the Useful Frequency Response of Measuring Instruments. However, such an arrangement is yet subject to the serious limitation that, in the upper frequency range for which compensation is thus provided, the device tends to differentiate any noise present. Such differentiation or high frequency amplification of noise increases with frequency and tends to overcome the advantages sought through the use of such device. Further, such an arrangement is yet subject to drift in the low frequency or D.-C. signal range.

In an altitude control loop such as an automatic aircraft landing system, both an altitude signal and an altitude rate signal are usually required for both control and damping (e.g., rate stabilization) of the control mode. A radar altimeter may be employed in such application to provide a drift-free reference. An altitude rate signal derived from the altitude signal demonstrates much noise due to differentiation of both the noise content of the altitude signal and noise internally generated in the radar, particularly at the upper part of the frequency response spectra. Accordingly, means are required for attenuating the noisy upper spectrum of the radar signal (which limits the dynamic response of the radar device) and for augmenting the dynamic response of the radar signal to achieve an improved noise-free dynamic response.

One method of achieving such augmented and improved response is to apply the filtered output of the radar altimeter to the torquer of the force-rebalance type velocity meter by means of the arrangement described, for example, in U.S. Patent 3,059,880 for Terminal Prediction Landing System granted October 23, 1962, to E. R. Buxton, assignor to North American Aviation, Inc., the assignee of the subject application. However, such arrangement uses a precision integrating accelerometer mounted upon a stable platform, and hence suffers the weight, space and cost penalties attendant to such use. Accordingly, it is a general object of this invention to provide improved altitude and rate of descent sensing without the use of force-rebalance type inertial sensors.

Another method for processing and augmenting the drift-free signals from a radar altimeter to provide rate and position signals having improved dynamic characteristics is to additionally employ an inertial sensor of a first (or higher) derivative of the improved signal desired. The signals from the drift-free source and the derivative source are then suitably filtered, processed and combined to achieve the desired signal of improved quality.

In providing an improved response for a rate of descent application, network schemes employing non-zero frequency integrators have been considered. However, electronic or non-zero frequency integrators are unsatisfactory in low frequency applications. Mechanical integrators while capable of integrating down to zero frequency occupy much space and weight and require mechanical adjustment. Accordingly, it is a further general object of this invention to provide improved altitude and rate of descent sensing without the use of mechanical or zero frequency integrators.

In carrying out the principles of this invention in accordance with a preferred embodiment thereof, there is provided means for producing a first signal indicative of rate of descent and a second signal indicative of position, and means for providing improved dynamic response, including an altitude sensor; a differentiator having a first order lag network associated therewith and responsively connected to the altitude sensor; a first and second lag network in series, the first lag network being responsively connected to the differentiator and the second lag network providing a first signal output. A first summing means is interposed between the differentiator and the first lag network and responsively connected to compare the first output signal with the output from the differentiator. There is also provided an accelerometer oriented to measure vertical acceleration, and a second summing means interposed between the first and second lag networks for summing the outputs from the accelerometer and the first lag.

There is further provided a third and fourth lag network in series circuit, the third lag network being responsively connected to the position sensor and the fourth lag network providing a second signal output. A third summing means is interposed between the position sensor and third lag network, and is responsively connected for comparing the second output signal with the output from the position sensor. A fourth summing means is interposed between the third and fourth lag networks and is responsively connected for summing the first output signal with the output from the third lag network.

With the above described arrangement, the first and second output signals will display improved dynamic response as a velocity and position signal, respectively. The flat frequency response range of the signal range of each of these two output signals will be extended without untoward generation and amplification of system noise, due to the processing and augmentation of the input signals to the device. The frequency band of such response is limited only by the dynamic response of the accelerometer. Further, a relatively inexpensive accelerometer having marginal performance characteristics may be employed, instead of a device of the class usual to inertial guidance system applications.

An object of this invention, therefore, is to provide means for obtaining a velocity and position signal of improved dynamic response.

It is another object of this invention to provide velocity and position signals having reduced noise characteristics.

It is yet another object of this invention to provide low cost means including low precision accelerometer and network means for enhancing dynamic response of a radar altimeter.

It is still another object of this invention to provide improved sensing means having broad band response and low drift.

It is further an object of this invention to provide means including a radar altimeter and a simple spring-restrained mass type accelerometer for generating velocity and positions signals having improved dynamic characteristics.

It is still a further object of this invention to provide means for combining the output signals from an accelerometer and a position sensor for generating position and velocity signals having reduced noise and improved dynamic characteristics.

These and other objects of this invention will become apparent from the description taken in connection with the accompanying drawings in which:

FIG. 1 is a block diagram of a system embodying the principles of this invention.

FIG. 2 is a functional diagram describing the transfer function of the device of FIG. 1.

In the drawings, like reference characters refer to like parts.

Figure 3:
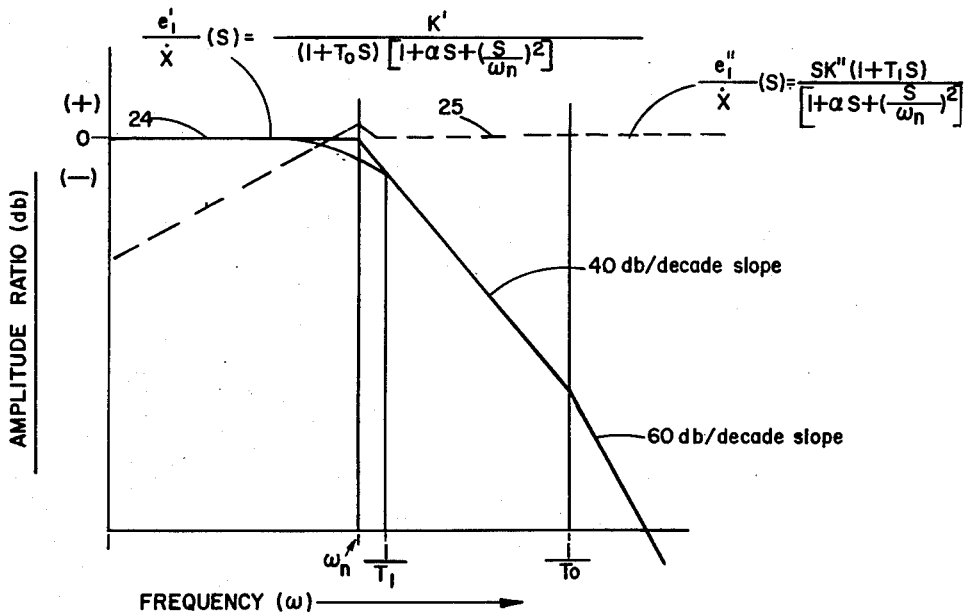
FIG. 3 is a Bode diagram of the amplitude response of the device of FIG. 1 to several velocity component inputs as a function of frequency.

The device of the subject invention derives a velocity signal from the suitably combined output signals of a position sensor and an accelerometer, whereby the device represents a velocity sensor combination displaying improved dynamic characteristics. A drift-free position sensor such as a radar altimeter may be used to provide a drift-free velocity signal by applying the output of such altimeter to a differentiator circuit and a lag network in series for filtering. Such differentiator may comprise a tachometer device or other means well known in the art for achieving an output signal indicative of a first derivative of an input signal. Such filtering or attenuation is required to attenuate the noisy upper frequency response of the differentiated position signal, and results in a drift-free velocity signal of limited frequency range. Such filtering may be provided by at least one first order lag by means well known to those skilled in the art.

Analytically, the Laplace transfer function of the response of such a combination may be represented:

$$e_0(s) = X(s)\frac{s}{(1+T_a s)} = \frac{\dot{X}(s)}{(1+T_a s)} \qquad (1)$$

Where:

$s$ = Laplace operator
$X$ = displacement signal from the position sensor
$\dot{X}$ = the first derivative X with respect to time
$e_0$ = the output signal from the differentiator
$T_a$ = the time constant of the first order time lag of the differentiator.

The asymptotic amplitude ratio response of such output signal to velocity inputs as a function of frequency will be flat or unattenuated up to the filter lag break frequency $1/T_a$. At frequencies above the break frequency the amplitude ratio response of the velocity signal will be attenuated at a rate of −20 db per decade for the lag employed in Equation 1.

An acceleration sensing device such as a spring-restrained-mass type accelerometer may be used to provide a signal indicative of velocity in an upper frequency region within the frequency response of the instrument. Such a signal is achieved by applying the output of the accelerometer to a first order lag circuit which serves as an integrator at such higher frequencies. Analytically, the transfer function for the response of such a combination may be represented:

$$e_0(s) = \ddot{X}(s)\frac{1}{(1+T_b s)} = \dot{X}(s)\frac{S}{(1+T_b s)} \qquad (2)$$

Where:

$s$ = Laplace operator
$\ddot{X}$ = the acceleration signal from the accelerometer
$\dot{X}$ = the first integral of $\ddot{X}$ with respect to time
$e_0$ = the output signal from the lag circuit
$T_b$ = the time constant in seconds of the first order lag The asymptotic amplitude response of such output signal to velocity inputs as a function of frequency will be flat or unattenuated for frequencies above the break frequency $1/T_b$. For frequencies below the break frequency $1/T_b$ the response will be attenuated at a rate of 20 db per decade, as zero frequency is approached.

By suitably combining or summing the output signals of the devices represented by Equations 1 and 2, it is possible to provide a velocity signal having a flat low frequency response and a flat high frequency response. Such suitable combination requires that the high frequency gain (e.g., the asymptotic gain above the break frequency $1/T_b$) of the device of Equation 2 be made equal to the zero frequency or D.-C. gain of the device of Equation 1. In combining or summing the two signals, the low gain of the device of Equation 2 at low frequencies will contribute practically no significant signals to the signal strenth from the device of Equation 1 in such low frequency region. Similarly, the attenuated high frequency response of the device in Equation 1 will contribute no significant signal to the signal strength from the device of Equation 2 in such high frequency region. Hence, the frequency response of the combination of Equations 1 and 2 at very low and very high frequencies can be made to resemble a common single gain level. Further, the high frequency gain region of Equation 2 should be sufficiently separated from the flat gain frequencies of the device of Equation 1 that the sum of the outputs of the devices will represent a flat frequency response at the common gain level in intermediate frequency regions, as well as at the extreme upper and lower frequency regions of response. Such separation may be achieved adjusting the lags of Equations 1 and 2 to provide a single common break frequency $$\left(\text{e.g., let } \frac{1}{T_a} = \frac{1}{T_b}\right)$$

If separate network parameters are used to separately adjust the break frequency parameters for each of the devices of Equations 1 and 2 difficult and tedious impedance matching problems arise in design practice. Such matching problem is avoided in achieving a common break frequency by means of a closed loop device, as shown in FIG. 1. However, such matching of the break frequencies alone is not enough to achieve the desired flat frequency response in the intermediate frequency region (e.g., that frequency region about the break frequencies $1/T_a$ and $1/T_b$); further signal shaping and matching is required. Such additional signal shaping is conveniently provided by means of the closed loop arrangement shown in FIG. 1.

Referring to FIG. 1, a block diagram of a system embodying the principles of this invention is illustrated. The motion of a vehicle employing the system of FIG. 1 is detected by means of position sensor 10 and accelerometer 11, the accelerometer being oriented to detect the second derivative with respect to time of the position detected by sensor 10. A filtered differentiator 12, having at least a first order lag associated therewith, is responsively connected to the output of sensor 10. There is also provided a first and second lag network or attenuator 13 and 14 connected in series circuit, first lag network 13 being responsively connected to the differentiator and the second lag network providing a first output or velocity signal. A first summing means 15 is interposed between differentiator 12 and first lag network 13, and is responsively connected to provide negative feedback means for comparing the velocity output signal with the output from differentiator 12. There is also provided a second summing means 16 interposed between first lag network 13 and second lag network 14, and responsively connected for summing the outputs from the accelerometer 11 and first lag network 13.

There is further provided a third and fourth lag network or attenuator 18 and 19 in series circuit, third lag network 18 being responsively connected to position sensor 10 and fourth lag network 19 providing a second output or position signal. A third summing means 20 is interposed between sensor 10 and third lag network 18, and is responsively connected to provide negative feedback means for comparing the position output signal with the output from sensor 10. A fourth summing means 21 is interposed between third lag network 18 and fourth lag network 19, and is responsively connected for summing the velocity input signal from element 14 with the output from element 18.

Operation of the device of FIG. 1 may be appreciated from an analytical description of the arrangement of its several component parts, as will be more fully described below in connection with the transfer function block diagram of FIG. 2.

Referring to FIG. 2, there is illustrated the block diagram algebra of the device of FIG. 1, each functional block of FIG. 1 having the approximate transfer function shown in the corresponding block of FIG. 2. The two feedback loops shown in FIG. 1 are somewhat similar in nature, one being used for generating an improved velocity signal and the other for generating an improved position signal. Each employs a basic input to the corresponding negative feedback summing means, and sums an augmenting signal in the forward loop. Therefore, an analytical description of one of the two feedback loops, say the velocity signal loop, will serve to illustrate the manner of operation of each of them.

The expression for the velocity signal output $e_1$ from element 14 may be written as the sum of the inputs to element 16 multiplied by the transfer function of element 14. Element 10 in sensing position with a static gain $K_0$, provides an output signal indicative of $x_1$, the first integral of rate. Hence, the transfer function of sensor 10 to a rate input $\dot{x}(s)$ is expressed in Laplace notation as $K_0/s$. Similarly, element 11 in sensing acceleration with a static gain $K_3$, provides an output signal indicative of $\ddot{x}_1$ the first derivative of rate. Hence, the transfer function of sensor 11 to a rate input $\dot{x}(s)$ is expressed in Laplace notation as $sK_3$. In block diagram algebra form, employing the block transfer functions illustrated in FIG. 2:

$$e_1(s) = \left\{ \left[ x_i K_0 \left( \frac{sK_1}{1+T_0 s} \right) - K_5 e_1 \right] \frac{K_2}{(1+T_1 s)} + K_3 \ddot{x}_i \right\} \frac{K_2}{(1+T_2 s)} \quad (3)$$

Rearranging Equation 3:

$$e_1 \left[ 1 + \frac{K_2 K_4 K_5}{(1+T_1 s)(1+T_2 s)} \right] = \left[ x_i \frac{sK_0 K_1 K_2}{(1+T_0 s)(1+T_1 s)} + \ddot{x}_2 K_3 \right] \frac{K_4}{(1+T_2 s)} \quad (4)$$

Solving for $e_1$:

$$e_1 = [x_i G_1(s) + \ddot{x}_i G_2(s)] \frac{K_7}{1+\alpha s + \beta s^2} \quad (5)$$

Where:

$$G_1(s) = \frac{sK_0 K_1 K_2 K_4}{(1+T_0 s)}$$

$$G_2(s) = K_3 K_4 (1+T_1 s)$$

$$\frac{1}{\beta} = \frac{1+K_2 K_4 K_5}{T_1 T_2}$$

$$\alpha = \frac{T_1 + T_2}{1+K_2 K_4 K_5}$$

$$K_7 = \frac{1}{1+K_2 K_4 K_5}$$

Approximating the roots of the quadratic denominator $(1+\alpha s+\beta s^2)$ as a pair of damped complex conjugate pairs, a second order break frequency thereof, $\omega_n$, may be approximated as $$\frac{1}{\sqrt{\beta}}$$

The physical effect of such quadratic denominator is as a second order attenuation filter or lag at signal frequencies above (e.g., greater than) $\omega_n$ for inputs from both the position sensor and the accelerometer. In other words, an advantage of the desired closed loop arrangement is that it provides a common break frequency for combining the processed signals from both sensor 10 and accelerometer 11, thereby avoiding network matching between the several signal channels. Because the effect of such feedback loop is that of a second order attenuation filter, the value of the break frequency $\omega_n$ should be selected to be below the lowest predominant noise frequency from sensor 10. The velocity signal output $e_1$ may be considered to be comprised of two signal components, $e_1'$ processed from sensor 10 and $e_1''$ processed from accelerometer 11, the frequency responses of which to a velocity input are shown in FIG. 3.

Referring to FIG. 3 there is shown a Bode diagram of the amplitude response of the signal components of first output signal $e_1$. Curve 24 (in solid line) represents the response $$\frac{e_1'}{\dot{x}}(\omega)$$

of the output signal component contributed by sensor 10. Curve 25 (in dotted line) represents the response $$\frac{e_1''}{\dot{x}}(\omega)$$

of that output signal component contributed by accelerometer 11.

The transfer function of the processed position signal component $e_1'$ may be seen to be a rate signal achieved by differentiating and attenuating the position signal $x_i(s)$ from sensor 10, and may be written as follows:

$$e_1'(s) = x_i(s) \frac{sK_0 K_1 K_4}{(1+T_0 s)} \frac{K_7}{\left[ 1+\alpha s + \left( \frac{s}{\omega_n} \right)^2 \right]} =$$

$$\dot{x}(s)\frac{K'}{(1+T_0s)\left[1+\alpha s+\left(\frac{s}{\omega_n}\right)^2\right]} \tag{6}$$

$$\frac{e_1'}{\dot{x}}(s)=\frac{K'}{(1+T_0s)\left[1+\alpha s+\left(\frac{s}{\omega_n}\right)^2\right]} \tag{7}$$

In substituting $(j\omega)$ for the operator $(s)$, it is seen that the amplitude response of $$\frac{e_1'}{\dot{x}}(J\omega)$$

will be essentially flat at frequencies below the second order break frequency of $\omega_n$, provided the break frequency $1/T_0$ of the first order lag term of filtered differentiator 12 is selected to be much larger than $\omega_n$, as shown by curve 24 in FIG. 3. Accordingly, $1/T_0$ is selected to be much larger than $\omega_n$ in order to prevent unnecessary attenuation of position sensor signals. Then, the asymptotic amplitude response is seen to be attenuated at an initial rate of $-40$ db per decade at frequencies greater than $\omega_n$, and at a rate of $-60$ db per decade at frequencies above both $\omega_n$ and $1/T_0$. The main function of such first order filter term in the transfer function of element 12 is to limit the noise generated in element 12 itself, in order to prevent signal saturation.

The transfer function of the processed acceleration signal component $e_1''$ may be seen to be a rate signal achieved by lagging and shaping the acceleration signal $\ddot{x}_i(s)$ from accelerometer 11, and may be written as follows:

$$e_1''(s)=\ddot{x}(s)\frac{K_3K_4K_7(1+T_1s)}{\left[1+\alpha s+\left(\frac{s}{\omega_n}\right)^2\right]}=\dot{x}(s)\frac{sK''(1+T_1s)}{\left[1+\alpha s+\left(\frac{s}{\omega_n}\right)^2\right]} \tag{8}$$

$$\frac{e_1''}{\dot{x}}(s)=\frac{sK''(1+T_1s)}{\left[1+\alpha s+\left(\frac{s}{\omega_n}\right)^2\right]} \tag{9}$$

In substituting $(j\omega)$ for the operator $(s)$, it is seen that the amplitude response of $$\frac{e_1''}{\dot{x}}(s)$$

will be essentially flat at frequencies substantially above the break frequency $\omega_n$, while the asymptotic amplitude response will be attenuated at a rate of 20 db per decade for frequencies less than $\omega_n$ as zero frequency is approached, as shown by curve 25 in FIG. 3.

Both $1/T_1$ and $1/T_2$ of element 13 and 14 respectively are selected to be larger than $\omega_n$. However, break frequency $1/T_1$ of first lag 13 should be made much larger than the break frequency $1/T_2$ of second lag 14 in order to assure that the high frequency response of the combined signal is more effectively controlled by the processing of the input from accelerometer 11, and to avoid unnecessary attenuation of the upper spectra of the feedback signals from summing means 15.

The analysis of the output signal $e_1$ as being comprised of two signal components $e_1'$ (derived from position sensor 10) and $e_1''$ (derived from accelerometer 11) is useful for gaining some insight as to the principles of operation of the components of the system. Such analysis is also useful for examining the application of the combination to a hydrofoil vehicle altitude control system, such as is disclosed in U.S. application Serial No. 92,026 filed February 27, 1961 and assigned to North American Aviation, Inc., the assignee of the subject invention. Such usefulness of a separate analysis of the component output signals arises from the fact that the accelerometer 11 of FIG. 1 measures motion relative to inertial space, whereas the radar altimeter 10 or like position sensor measures altitude relative to the undulating surface of the water above which the hull of the hydrofoil vehicle is maintained during hydroplaning.

However, in applying the invention to an automatic aircraft landing system, a more direct method of analysis may be employed to evolve a single transfer function for the rate signal response to a rate input $$\frac{e_1}{\dot{x}}(s)$$

Such direct analysis is possible in a landing system application because the measurement of vertical motion relative to a level runway strip are substantially the same as measurements of such motion made relative to inertial space. Further, where terrain irregularities exist at initial landing approach ranges or horizon distances from the runway, such irregularities (appearing as high frequency disturbances to the radar altimeter at usual aircraft speeds or forward velocities) are filtered by the low pass filters (not shown) associated with the radar output. Further, such irregularities are not detected by the accelerometer, which responds only to inertial inputs or aircraft accelerations relative to an inertial frame of reference. Accordingly, for an aircraft landing system application, the block diagram algebra of the device of FIG. 1 may be viewed as having a common input $\dot{x}_i$ to elements 10 and 11, and the transfer function may be derived directly from such block diagram algebra:

$$e_1=\left\{\left[\dot{x}_i\frac{K_0}{s}\frac{sK_1}{(1+T_0s)}-K_5e_1\right]\frac{K_2}{1+T_1s}+S\dot{x}K_3\right\}\frac{K_4}{1+T_2s} \tag{10}$$

Transposing and collecting coefficients of $e_1$ on the left hand member of Equation 11:

$$e_1\left[1+\frac{K_2K_4K_5}{(1+T_1s)(1+T_2s)}\right]=$$
$$\dot{x}\left[\frac{K_0K_1K_2}{(1+T_0s)(1+T_1s)}+K_3s\right]\frac{K_4}{(1+T_2s)} \tag{11}$$

Solving for the output transfer function $$\frac{e_1}{\dot{x}}(s)=\frac{K_0K_1K_2+K_3s(1+T_0s)(1+T_1s)}{(1+T_0s)(1+T_1s)}\left(\frac{K_4}{1+T_2s}\right)\left[\frac{(1+T_1s)(1+T_2s)}{(1+T_1s)(1+T_2s)+K_2K_4K_5}\right] \tag{12}$$

$$\frac{e_1}{\dot{x}}(s)=\frac{K_4[K_0K_1K_2+K_3s+K_3(T_0+T_1)s^2+K_3T_0T_1s^3]}{(1+T_0)[(1+K_2K_4K_5)+(T_1+T_2)s+T_1T_2s^2]} \tag{13}$$

$$\frac{e_1}{\dot{x}}(s)=\left(\frac{K_0K_1K_2K_4}{1+K_2K_4K_5}\right)\frac{\left[1+\frac{K_3s}{K_0K_1K_2}+\frac{K_3(T_0+T_1)s^2}{K_0K_1K_2}+\frac{K_3T_0T_1s^2}{K_0K_1K_2}\right]}{(1+T_0s)\left[1+\frac{T_1T_2}{1+K_2K_4K_5}s+\frac{T_1T_2s^2}{(1+K_2K_4K_5)}\right]} \tag{14}$$

To achieve the desired flat frequency response (within the limits of the frequency response of accelerometer 11), the dynamic terms or roots of the numerator expression of Equation 14 should be equated or made equal to those of the denominator. For reasons which will become apparent, this cannot be ideally done in a physical system. The practical means of achieving the desired result in an actual device is to assign relative values to the parameters of the numerator and denominator terms whereby corresponding roots of the numerator and denominator are made to approach each other as close as may be, as is to be appreciated from the following engineering approximations: Recalling that the purpose of the time constant $T_0$ is only to prevent signal saturation of differentiator 12 of FIG. 1 due to noise, $T_0$ may be made very small. Thus, the break frequency represented by the reciprocal of $T_0$ is made very high relative to the second order break frequency represented by the square root of the reciprocal of denominator term $$\frac{T_1 T_2}{1+K_2 K_4 K_5}$$

$$T_0 \ll \sqrt{\frac{T_1 T_2}{1+K_2 K_4 K_5}} \qquad (15)$$

Hence, the root $(1+T_0 s)$ may be factored out of the numerator of Equation 14, cancelling a like term in the denominator thereof, whereby Equation 14 may be rewritten as follows:

$$\frac{e_1}{\dot{x}}(s) = \left(\frac{K_0 K_1 K_2 K_4}{1+K_2 K_4 K_5}\right) \frac{\left[1+\frac{K_3 s}{K_0 K_1 K_2}+\frac{K_3 T_1}{K_0 K_1 K_2}s^2\right]}{\left[1+\frac{T_1+T_2}{(1+K_2 K_4 K_5)}s+\frac{T_1 T_2}{1+K_2 K_4 K_5}s^2\right]} \qquad (16)$$

Equating corresponding coefficients of like powers of the Laplace operator $(s)$ in Equation 16:

$$\frac{K_3}{K_0 K_1 K_2} = \frac{T_1+T_2}{1+K_2 K_4 K_5} \qquad (17)$$

$$\frac{K_3 T_1}{K_0 K_1 K_2} = \frac{T_1 T_2}{(1+K_2 K_4 K_5)} \qquad (18)$$

In view of the similarity of the corresponding coefficients or left hand members of Equations 17 and 18, it would appear that $(T_1+T_2)$ is equal to the value of $T_2$ above. However, while such condition cannot be true, it can be approximated if $T_1$ is made much smaller than $T_2$. In equation form:

$$(T_1+T_2) \rightarrow T_2$$

Where: $\qquad T_1 \ll T_2$

Hence, a preferred criterion for a practical design for the embodiment illustrated in FIGS. 1 and 2 may be summarized as follows: The lowest predominant noise frequency as well as the term $1/T_0$ should be many times (say twenty to fifty times) larger than the term $$\frac{1+K_2 K_4 K_5}{T_1 T_2}$$

Also, the term $1/T_1$ should be many times (say, ten to twenty times) larger than the term $1/T_2$. Further, the term $$(1+K_2 K_4 K_4)\frac{1}{T_2}$$

should be equal to the term $$K_0 K_1 K_2 \frac{1}{K_3}$$

Figure 4:
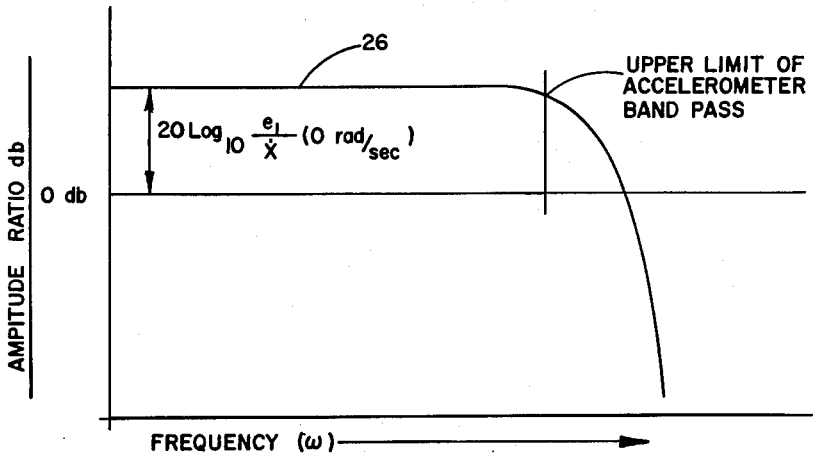
FIG. 4 is a Bode diagram of the combined amplitude response of the device of FIG. 1 to a common velocity input as a function of frequency.

By satisfying the above conditions, the device of FIG. 2 will provide an essentially flat rate signal frequency response up to the lower frequency of $1/T_0$ and the acceleration signal bandpass limits of accelerometer 11, as shown in FIG. 4. Therefore, the effective frequency insensitive transfer function of the velocity signal loop becomes:

$$\frac{e_1}{\dot{x}}(s) = \frac{K_0 K_1 K_2 K_4}{1+K_2 K_4 K_5} \qquad (19)$$

a constant which is independent of frequency.

Similarly, by maintaining a similar relationship between corresponding gain and time constant terms of corresponding elements of the position signal loop of FIG. 1, a similarly flat position signal frequency response is obtained.

Figure 5:
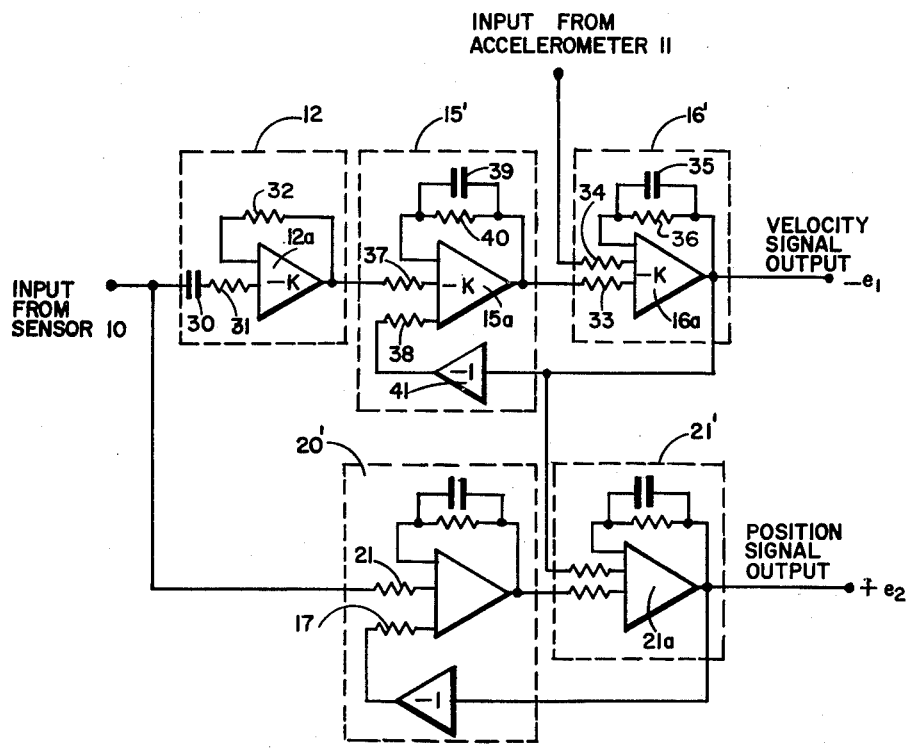
FIG. 5 is a preferred embodiment of the device of FIG. 1.

Referring to FIG. 5, there is illustrated a schematic diagram of a preferred embodiment of the device of this invention. There is provided a differentiator 12 adapted to be connected to a radar altimeter or the like, a first summing circuit 15' (with associated lag circuit elements) responsively coupled to the output of differentiator 12 and a second summing circuit 16'. Second summing circuit 16' (with associated lag circuit elements) is responsively connected to element 15' and adapted to be connected to an accelerometer, for providing a velocity signal output. There is also provided a third and fourth summing circuit 20' and 21', substantially similar to elements 15' and 16' respectively, third summing circuit 20' being responsively connected to the input to differentiator 12 and the output from fourth summing circuit 21'. Fourth summing circuit 21' is responsively connected to the output from elements 20' and 16' to provide a position signal output.

Differentiator 12 is comprised of a D.-C. operational amplifier 12a, having an input impedance including an input capacitor 30 in series with an input resistor 31, and a feedback resistor 32. Where the open-loop gain (—K) of the amplifier is extremely high (say 10,000 volts/volt) and the sense of the output is reversed with respect to that of the input, the transfer function is expressed as the ratio of the feedback impedance divided by the input impedance, from which it is to be seen that element 12 of FIG. 5 provides a transfer function of the form described in FIG. 2.

Summing circuit 16' is comprised of a D.-C. operational amplifier 16a having a first and second input summing resistor 33 and 34, one end of both of which is commonly connected to the input of amplifier 16a. The other end of resistor 33 is connected between the output of element 15' and the other end of resistor 34 is adapted to be connected to the output from an accelerometer. There is also connected across the input and output of amplifier 16a a negative feedback capacitor 35 in parallel with a negative feedback resistor 36. The purpose of the combination of capacitor 35 and resistor 36 is to contribute a lag time constant to the transfer function of element 16', thereby incorporating the function of element 14 of FIG. 1. Selection of the value of resistor 36 varies both the gain $K_4$ and time constant $T_2$ of the transfer function of element 16', while the selection of the value of capacitor 35 effects the time constant only. Fourth summing circuit 21' in FIG. 5 is seen to be similarly arranged and constructed as element 16', and similarly combines the functions of summing means 21 and fourth lag means 19 of FIG. 1.

Second summing circuit 15' is similarly comprised of a D.-C. operational amplifier 15a, having a first and second input summing resistor 39 and 40, one end of both of which is commonly connected to the input of amplifier 15'. The other end of resistor 37 is connected to the output from element 12, and the other end of resistor 38 is connected to the output of summing circuit 16'. The purpose of summing circuit 15' is to compare the output of element 12 with the output of element 16', so as to provide a signal indicative of the difference therebetween, similar to the function of element 16 in FIG. 1. Accordingly, a sign-changing amplifier 41 is interposed between the output of element 16' and resistor 38 for changing the sense of the applied output of element 16' relative to that of element 12. The value selected for resistor 38 adjusts the gain $K_5$ of the input thereby provided in the manner of gain element 17 of FIG. 1.

There is also connected across the input and output of amplifier 15a a negative feedback capacitor 39 and negative feedback resistor 40. The purpose of the combination of capacitor 39 and resistor 40 is to contribute a lag time constant to the transfer function of element 15', thereby incorporating the function of element 13 of FIG. 1. Third summing circuit 20' in FIG. 5 is seen to be similarly arranged and constructed as element 15', and similarly combines the functions of summing means 20 and third lag means 18 in addition to gain element 20 of FIG. 1.

While the preferred embodiment of FIG. 5 has been described and illustrated in terms of a combination of D.-C. operational amplifiers, it is to be readily appreciated that the concept of the invention is not limited to D.-C. systems, but can be readily applied to A.-C. systems by means readily understood by those skilled in the art.

Hence, it is to be seen that improved closed loop means are provided for achieving two separate signal outputs, one being the integral of the other, both having an improved frequency response to two inputs, one input being the integral of one output signal and the other input being the derivative of said output signal.

Although the invention has been described and illustrated in detail, it is to be clearly understood that the same is by way of illustration only and is not to be taken by way of limitation, the spirit and scope of the invention being limited only by the scope of the appended claims.

I claim:

1. In a device for producing a first signal indicative of rate of change of position with respect to time and a second signal indicative of position with respect to time, means for providing improved dynamic response comprising: a position sensor; a differentiator having a first-order lag associated therewith and coupled to said position sensor; a first first-order lag network and second first order lag in series circuit, said first first-order lag being coupled to said differentiator, and said second lag providing a first signal output, a first summing means interposed between said differentiator and said first first-order lag and coupled to said first output signal for comparison with the output of said differentiator; an acceleration sensor oriented to measure the second derivative of the variable sensed by said position sensor; a second summing means interposed between said first and second lags for summing the outputs from said accelerometer and said first first-order lag.

2. The combination of claim 1 additionally comprising third and fourth first-order lags in series circuit, said third lag being coupled to said position sensor, and said fourth lag providing a second signal output; a third summing means interposed between said position sensor and said third lag and coupled to said second output signal for comparison with the output from said position sensor; a fourth summing means interposed between said third and fourth lags and coupled to said first output signal for summing with the output from said third lag.

3. In a device for producing a signal indicative of rate of change of position with respect to time, means for providing improved dynamic response comprising: a position sensor having a gain $K_0$; a differentiator having a gain $K_1$ and time lag $T_0$ and being coupled to said position sensor; a first first-order lag network and second first order lag network in series circuit, said first first-order lag network having a gain $K_2$ and time lag $T_1$ and having its input coupled to the output of said differentiator, and said second lag having a gain $K_4$ and time lag $T_2$ and providing a first signal output; a first summing means interposed between said differentiator and said first first-order lag and coupled to said first output signal for comparison with the output of said differentiator; a gain device having a gain $K_5$ interposed between the output of said second lag and said first summing means; an acceleration sensor oriented to measure the second derivative of the variable sensed by said position sensor and having a gain $K_3$; a second summing means interposed between said first and second lags for summing the outputs from said accelerometer and said first first-order lag, the reciprocal of the differentiator time constant $T_0$ being at least twenty times the value of the term $$\sqrt{\frac{1+K_2K_4K_5}{T_1T_2}}$$

the reciprocal of the first lag time constant $T_1$ being at least ten times the reciprocal of the second lag time constant $T_2$, and the gain combination of $$(1+K_2K_4K_5)\frac{1}{T_2}$$

being equal to the ratio $$K_0K_1K_2\frac{1}{K_3}$$

4. The device of claim 3, additionally comprising means for producing a signal indicative of position as a function of time including means for providing improved dynamic response comprising: a gain element having a gain $K_1'$ coupled to said position sensor; a third first-order lag and fourth first-order lag in series circuit, said third first-order lag having a transfer function $$\frac{K_2'}{1+T_1's}$$

and being coupled to said gain element, and said fourth lag having a transfer function $$\frac{K_4'}{1+T_2's}$$

and providing a second signal output, a third summing means interposed between said gain element and said third first-order lag and coupled to said second output signal for comparison with the output of said gain element; a gain device having a gain $K_5'$ interposed between the output of said fourth lag and said third summing means; a fourth summing means interposed between said third and fourth lags for summing the outputs from said second and third first-order lags; the reciprocal of the third lag time constant $T_1'$ being at least ten times the reciprocal of the fourth lag time constant $T_2'$, and the gain combination of $$(1+K_2'K_4'K_5')\frac{1}{T_2'}$$

being equal to the ratio $$K_1'K_2'\frac{1}{K_3'}$$

5. Wide band, low drift sensing apparatus comprising: a differentiator circuit coupled to a position sensor; a first and second summing circuit; said first summing circuit being coupled to the output from said differentiator circuit and to a velocity output from said second summing circuit; said second summing circuit being coupled to said first summing circuit and to an accelerometer to provide a velocity signal output; a third summing circuit responsively connected to said position sensor and to a position output from a fourth summing circuit; said fourth summing circuit being coupled to said velocity output and said third summing circuits for providing a position signal output; said second summing circuit comprising a D.-C. operational amplifier having a first and second input summing resistor each having an end commonly connected to the input of said D.-C. operational amplifier, the other end of said second input resistor being connected to the output of said first summing circuit; a first negative feedback resistor and capacitor connected in parallel across the input and output of said operational amplifier; said first summing circuit comprising a second D.C. operational amplifier having a third and fourth summing resistor, each having one end commonly connected to the input of said second D.-C. amplifier, the other end of said third and fourth resistor being connected to the output from said differentiator and said second summing circuit respectively, a second negative feedback resistor and capacitor connected in parallel across the input and output of said second D.-C. amplifier; said third and fourth summing circuits being comprised of like components similarly arranged as said first and second summing circuits respectively.

6. The claimed device of claim 5 in which said differentiator is comprised of a D.-C. operational amplifier having a negative feedback resistor connected across the input and output of said amplifier and an input impedance comprised of input resistor and capacitor in series with the input to said amplifier.

7. In a system for producing a first output signal indicative of a sensed quantity and a second output signal indicative of the integral of said first output signal, the combination comprising: a first sensor providing a signal indicative of the first derivative of said first output signal, a first lag network coupled by a first summing means to the output of said sensor for providing said first output signal, a second sensor providing a signal indicative of the first integral of said first output signal, a differentiator connected to said second sensor, a first comparison means for comparing said first output signal with the signal from said differentiator, a second lag network coupling said comparision means to said summing means, a third lag network coupled by a second summing means to the output of said first lag network for providing said second output signal, a second comparison means for comparing said second output signal with the output from said second sensor, said second summing means being provided for summing the outputs from said first lag network and said second comparison means, and a fourth lag network coupling said second comparison means to said second summing means.

8. In a system for measuring a given variable quantity and its first derivative, the combination comprising: a first sensor for producing a first signal indicative of said variable quantity, a second sensor for producing a second signal indicative of a variable quantity which is representative of the second derivative of said given variable quantity, a first summing means for combining said second signal with a third signal to produce a first augmented output signal representative of the first derivative of said given variable quantity, differentiating means coupled to said first sensor for producing a fourth signal representing the first derivative of said first signal, a second summing means for comparing said first augmented signal with said fourth signal to produce said third signal, a third summing means for combining said first augmented output signal with a fifth signal to produce a second augmented output signal representative of said given variable quantity, and a fourth summing means for comparing said second output signal with said first signal to produce said fifth signal.

References Cited by the Examiner

UNITED STATES PATENTS

| | | | |
|---|---|---|---|
| 2,613,071 | 10/52 | Hansel | 73—490 |
| 2,775,122 | 12/56 | Smith | 73—179 |
| 2,930,035 | 3/60 | Altekruse | 73—178 |
| 2,934,267 | 4/60 | Wirkler | 235—151 |
| 2,970,471 | 2/61 | Summerlin | 73—179 |
| 3,028,592 | 4/62 | Parr | 343—9 |
| 3,035,795 | 5/62 | Larson | 244—77 |
| 3,055,214 | 9/62 | McLane | 73—178 |
| 3,077,557 | 2/63 | Joline | 244—77 |

RICHARD C. QUEISSER, Primary Examiner.

J. E. WEST, JAMES J. GILL, Examiners.